(12) United States Patent
Nelson et al.

(10) Patent No.: US 7,533,489 B1
(45) Date of Patent: May 19, 2009

(54) TREE SECURING DEVICE AND ASSOCIATED METHODS

(75) Inventors: Delwood Nelson, Crescent City, FL (US); Thomas R. Dean, Deland, FL (US); David A. Monk, Deland, FL (US); William Bartow Mercer, Crescent City, FL (US)

(73) Assignee: Pierson Supply Company, Inc., Pierson, FL (US)

( * ) Notice: Subject to any disclaimer, the term of this patent is extended or adjusted under 35 U.S.C. 154(b) by 322 days.

(21) Appl. No.: 11/614,473

(22) Filed: Dec. 21, 2006

(51) Int. Cl.
*A01G 17/14* (2006.01)
*A01G 17/12* (2006.01)

(52) U.S. Cl. ............................................. 47/43; 47/32.5

(58) Field of Classification Search ................ 47/32.4, 47/42, 32.5, 43, 32.6
See application file for complete search history.

(56) References Cited

U.S. PATENT DOCUMENTS

| 194,102 | A | | 8/1877 | Müller | |
|---|---|---|---|---|---|
| 472,137 | A | * | 4/1892 | McCallip | 47/32.4 |
| 525,010 | A | | 8/1894 | Fuller | |
| 1,040,891 | A | * | 10/1912 | Coon | 47/42 |
| 1,060,593 | A | | 5/1913 | Green | |
| 3,026,650 | A | | 3/1962 | Miller | |
| 3,328,915 | A | | 7/1967 | Elbert | |
| 4,222,198 | A | | 9/1980 | Napolitano et al. | |
| 4,319,428 | A | * | 3/1982 | Fox | 47/42 |
| 4,520,590 | A | * | 6/1985 | Schuh | 47/43 |
| 4,649,666 | A | | 3/1987 | Ness et al. | |
| 4,852,299 | A | | 8/1989 | Smoak et al. | |
| D310,769 | S | | 9/1990 | Jensen | |
| D310,948 | S | | 10/1990 | Jensen | |
| 5,402,600 | A | | 4/1995 | Tompkins | |
| 5,867,936 | A | | 2/1999 | Napolitano | |
| 6,073,391 | A | | 6/2000 | Tort et al. | |
| 6,282,836 | B1 | * | 9/2001 | Goode et al. | 47/43 |
| 6,301,830 | B1 | * | 10/2001 | Whipple | 47/43 |
| 6,708,446 | B2 | | 3/2004 | Ambrose | |
| 6,964,126 | B1 | | 11/2005 | Anderson | |
| 2003/0000138 | A1 | | 1/2003 | Ambrose | |

FOREIGN PATENT DOCUMENTS

| DE | 19505834 C1 | * | 10/1996 |
|---|---|---|---|
| GB | 2290446 A | * | 1/1996 |
| GB | 2400007 A | * | 10/2004 |
| JP | 02069116 A | * | 3/1990 |
| JP | 2000152723 A | * | 6/2000 |
| JP | 2005278579 A | * | 10/2005 |

* cited by examiner

*Primary Examiner*—Son T. Nguyen
(74) *Attorney, Agent, or Firm*—Allen Dyer Doppelt Milbrath & Gilchrist

(57) ABSTRACT

A system for supporting lines of trees growing in pots includes poles supported in an upright position, with a first cable running between pairs of poles. Tree trunks are attached to the first cable with a device that includes a length of helical cable, a second cable, that is adapted for mating with the first cable, formed into a "V" shape. A pair of deformable cylinders, one having a longitudinal slit, are included. The slit cylinder is positionable over the first cable on a first side of the tree trunk. The second cylinder is threaded onto the second cable into a notch section thereof, and placed on a second side of the tree trunk. The two arms of the second cable are wound about the first cable on opposite sides of the tree trunk to prevent slippage therebetween, leaving at least one end free for ease of disconnect.

20 Claims, 4 Drawing Sheets

TREE SECURING DEVICE AND ASSOCIATED METHODS

BACKGROUND OF THE INVENTION

1. Field of the Invention

The present invention relates to devices and methods for securing trees against excessive wind, and, more particularly, to such devices and methods for securing a plurality of trees growing in pots against excessive wind.

2. Description of Related Art

It is known to use opposed bumpers to support a tree against excessive wind, and also to use a strap to tether a wrapping for encircling the tree.

However, the previously known devices for supporting trees can damage the tree trunk. Further, with the approach of a storm, the tethers must be able to be released very quickly in order to lay the trees down, which can be a time-consuming and labor-intensive process in prior known systems.

SUMMARY OF THE INVENTION

A system, device, and method are provided in the present invention for supporting lines of trees growing in pots, preferably without substantially deforming or scuffing the trees. The system includes poles supported in an upright position, with a first cable running between pairs of poles. Tree trunks near their top ends are then attached to the first cable with the device of the invention.

The device comprises a length of helical cable, a second cable, that is adapted for mating with the first cable, formed into a "V" shape. The device further comprises a pair of deformable cylinders, one having a longitudinal slit therein. The slit cylinder can be positioned over the first cable on a first side of the tree trunk. The second cylinder is threaded onto the second cable into a notch section thereof, and placed on a second side of the tree trunk generally opposed to the first side. The two arms of the second cable are each wound about the first cable on opposite sides of the tree trunk in such a way as to prevent slippage therebetween.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
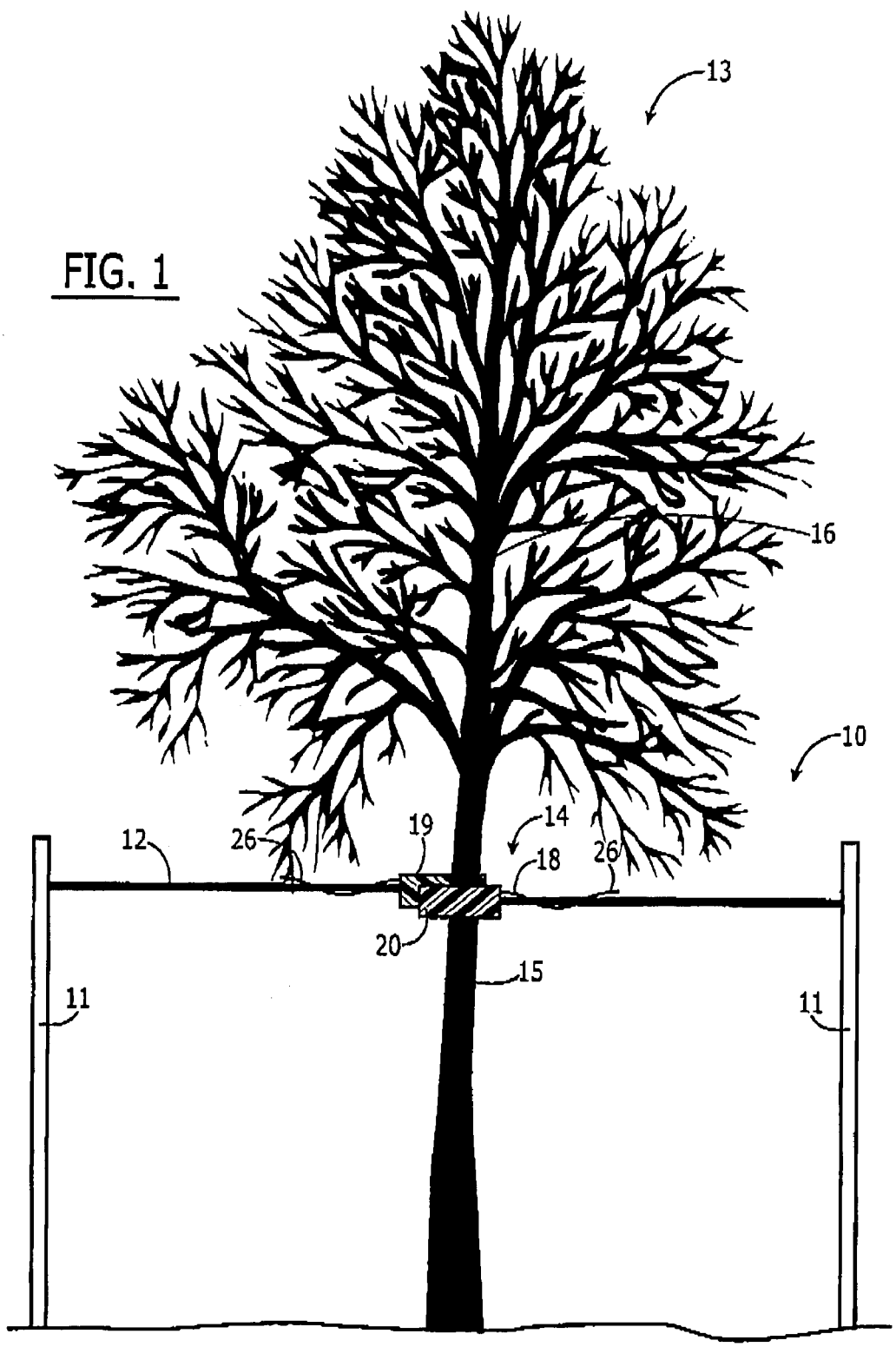
FIG. 1 is a schematic illustration of the system and device of the present invention.
Figure 2:
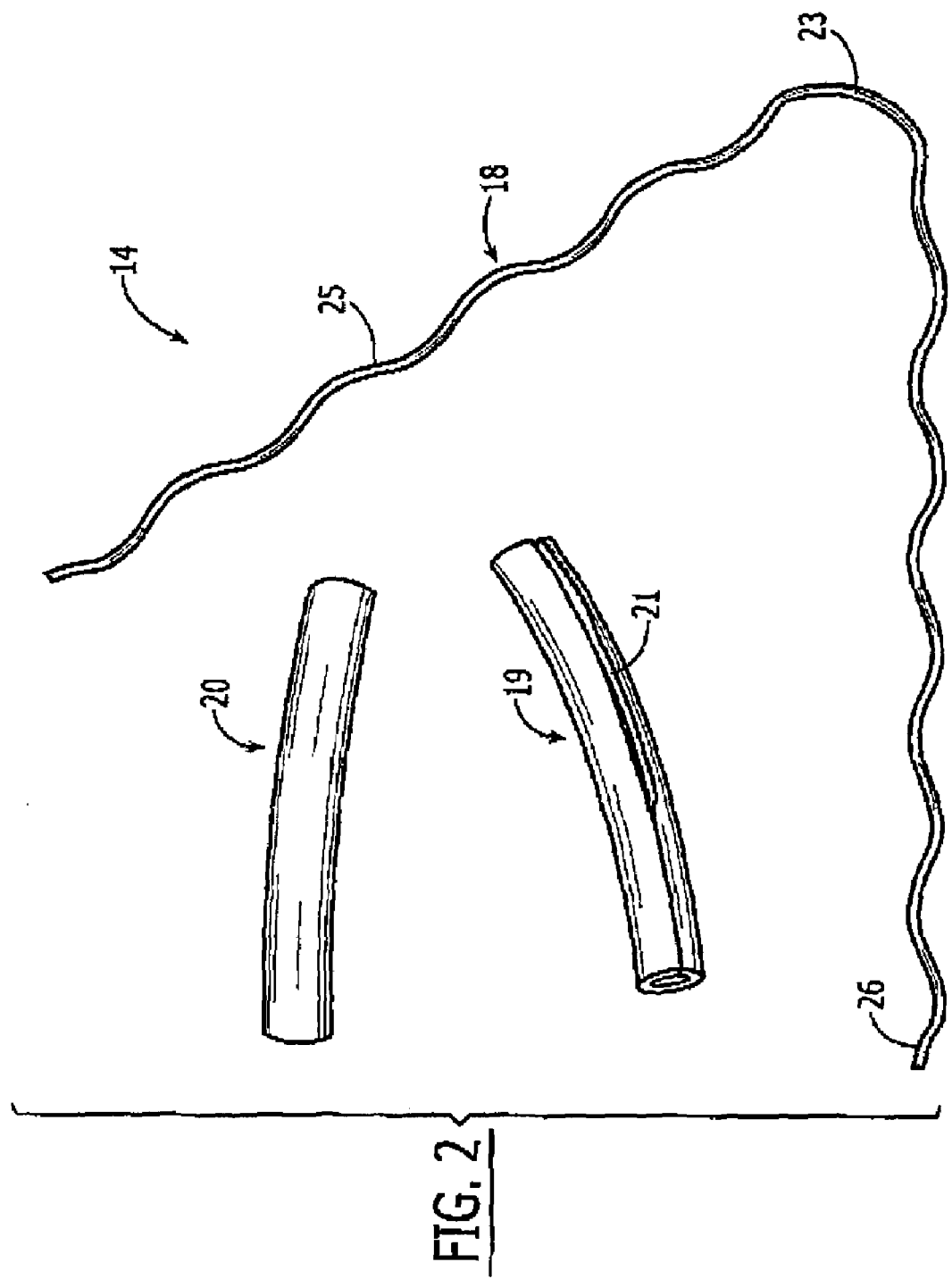
FIG. 2 illustrates the components of the device of FIG. 1.

A description of the preferred embodiments of the present invention will now be presented with reference to FIGS. 1-4.

The system 10 of the present invention (FIG. 1) can include a pair of poles 11 supported in an upright position, with a first cable 12 running between pairs of poles 11. The poles 11 can comprise, for example, what are referred to as "barn poles," although other types of poles such as fence poles or telephone poles could be used in certain circumstances. In a particular embodiment, the first cable 12 can comprise what is referred to as 1×7¼-in. seven-stranded, helically wound trellis line cable, that can be galvanized, for example, which assists in resisting corrosion and has also been found to assist in resisting slippage, although this is not intended as a limitation, and one of skill in the art will understand that many different types of cable could be used without departing from the spirit of the invention. A row of potted trees 13 can be supported by the first cable 12 using the device 14 of the present invention, with the tree trunks 15 near their top ends 16 attached to the first cable 12.

The device 14 in a particular embodiment (FIG. 2) comprises a length of helical cable, a second cable 18, that is adapted for mating with the first cable 12, bent into a "V" shape. The second cable 18 can comprise, for example, a single- or double-stranded, coated, helically wound cable, although this is not intended as a limitation. In a particular embodiment, several lengths of the second cable 18 can be provided, depending, for example, on the diameter of the tree being supported. For example, 18- and 24-in. lengths can be provided that are single-stranded, and 30-in. lengths that are double-stranded, although this is not intended as a limitation. The coating can comprise, for example, a material having gritty, slip-resistant properties, comprising a thin varnish-type material containing a fine sand. This coating is applied over the galvanized layer in a preferred embodiment. The second cable 18 can have various lengths, depending upon the diameter of the tree(s) desired to be supported. As an example, lengths of 18 and 24 in. can be provided that are single-stranded, and a length of 30 in. that is double-stranded.

The device 14 further comprises a pair of deformable cylinders 19,20, the first cylinder 19 having a longitudinal slit 21 therein and the second cylinder 20 unslit. The cylinders 19,20 can comprise PVC tubing, for example, or other suitable material having cushioning properties, although this is not intended as a limitation. The cylinders 19,20 preferably comprise an inexpensive material that is easily replaceable. In the embodiment using PVC tubing, exemplary dimensions can be ¾ in. outer diameter and ½ in. inner diameter.

Figure 3:
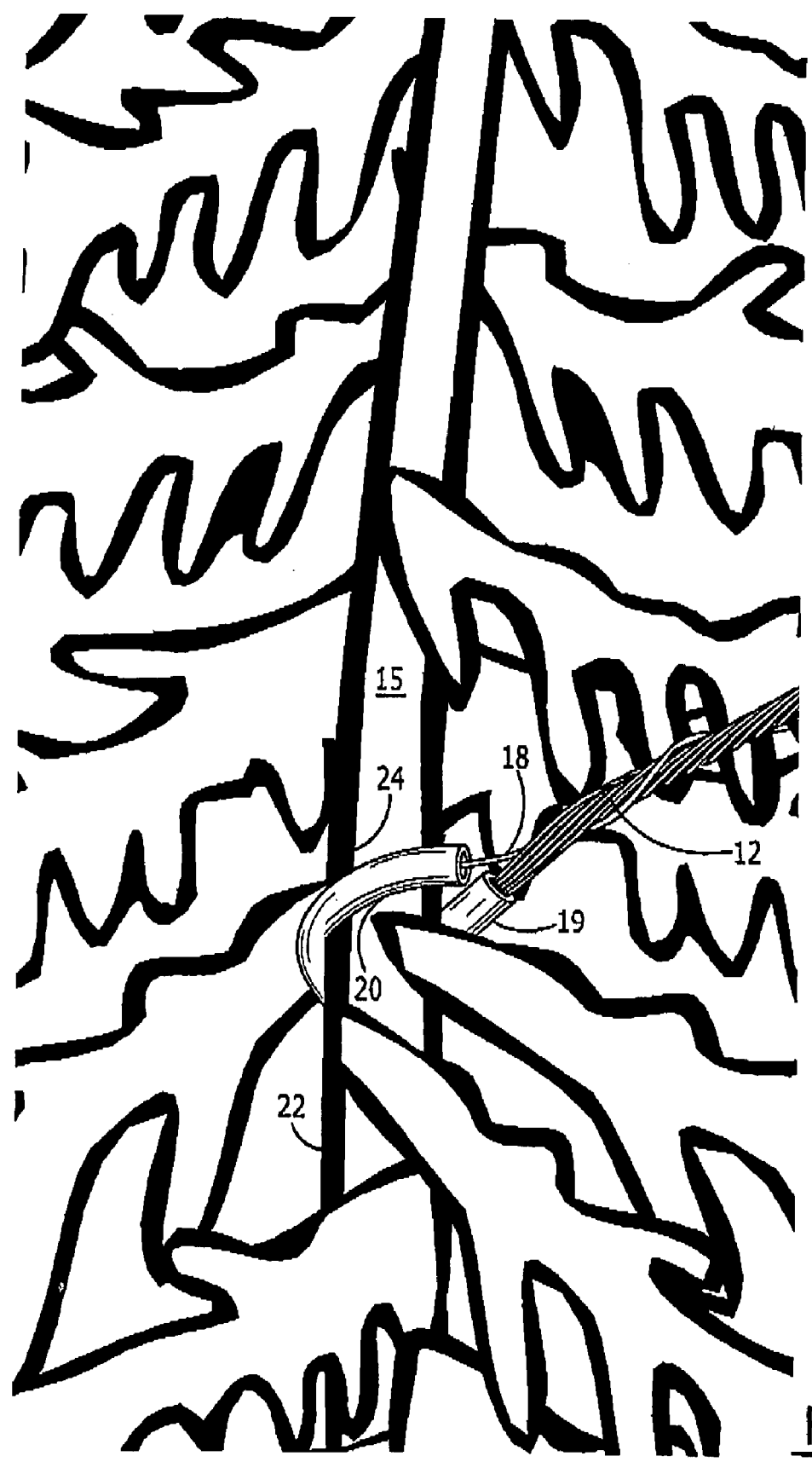
FIG. 3 is a side/end view of the device of FIG. 1.
Figure 4:
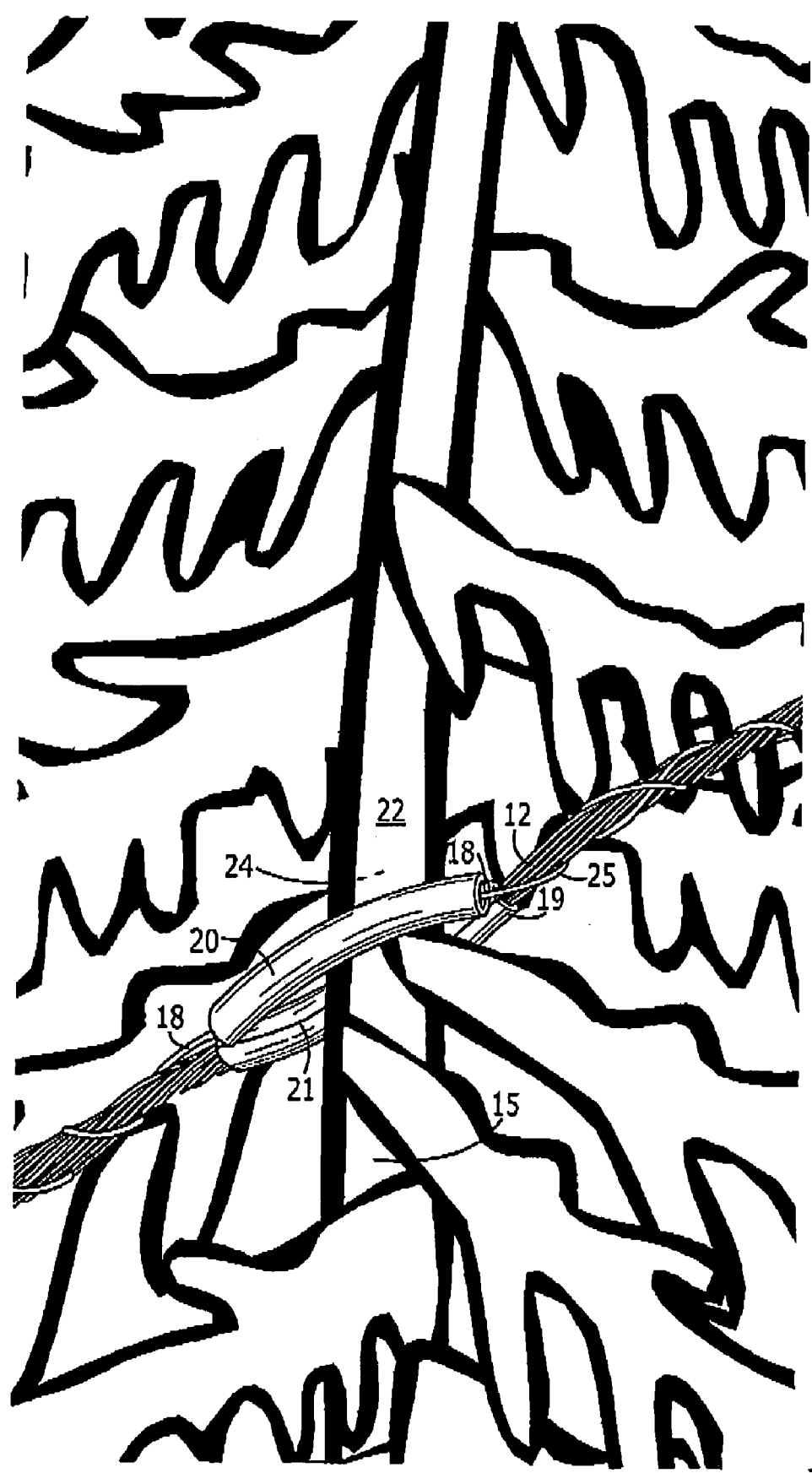
FIG. 4 is another side/end view of the device of FIG. 1.

The slit first cylinder 19 can be positioned over the first cable 12 on a first side 22 of the tree trunk 15 (FIGS. 3 and 4). The second cylinder 20 is threaded onto the second cable 18 into a notch section 23 thereof, and placed on a second side 24 of the tree trunk 15 generally opposed to the first side 22. The two arms 25 of the second cable 18 are each wound about the first cable 12 on opposite sides of the tree trunk 15 in such a way as to prevent slippage therebetween. The dimensions of the two cables 12,18 are preferably created specifically so that they can be wound relative to each other and form a secure and stable connection. Preferably each end 26 of the second cable arms 25 is left exposed for ease of disconnect in case of an impending storm.

The system 10 and device 14 of the present invention are inexpensive, secure, and easily installed. Further, the device 14 can be easily released without the use of tools when desired, as outlined above, by unwinding one arm 25 and pulling the tree trunk 15 free of the device 14 so that the tree can be laid on the ground or simply removed from the structure 10.

The system 10 and device 14 have proved beneficial in its ease of installation; ease of disconnect as desired without the use of tools (e.g., rapid removal of the device can be performed in the case of an impending storm); ease of transferring a tree to another area, for example, as it grows, for culling, or for selling.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A device for securing a tree in an upward orientation comprising:
   a first deformable cylinder having a longitudinal slit extending from a first end to a second end and into a lumen thereof, the lumen dimensioned for being positioned over a helically wound support cable extending substantially horizontally;
   a length of helically wound cable formed into a "V" shape;
   a second deformable cylinder threaded over the length of cable to a position covering a notch of the "V" shape;
   wherein in use the first deformable cylinder is positioned over the support cable, a first side of a tree trunk is positioned adjacent the first deformable cylinder, the second deformable cylinder is placed on a second side of the tree trunk opposed to the first side, and each end of the cable length is wound around the support cable on opposite sides of the tree.

2. The device recited in claim 1, wherein the first and the second deformable cylinders comprise a polyvinylchloride material.

3. The device recited in claim 1, wherein the support cable comprises a seven-stranded cable.

4. The device recited in claim 3, wherein the cable length is coated with an anti-slippage material.

5. The device recited in claim 3, wherein the cable length comprises one of a single-stranded and a two-stranded cable.

6. The device recited in claim 5, wherein the cable length is coated with an anti-slippage material.

7. A method for securing a tree in an upward orientation comprising the steps of:
   positioning a first deformable cylinder having a longitudinal slit extending from a first end to a second end and into a lumen thereof over a helically wound support cable extending substantially horizontally;
   threading a second deformable cylinder over a length of helically wound cable formed into a "V" shape to a position covering a notch of the "V" shape;
   positioning a first side of a tree trunk adjacent the first deformable cylinder;
   placing the second deformable cylinder on a second side of the tree trunk opposed to the first side; and
   winding each end of the cable length around the support cable on opposite sides of the tree.

8. The method recited in claim 7, wherein the winding step comprises leaving at least one end of the cable length free of the support cable, in order to facilitate a disconnection of the cable length from the support cable.

9. The method recited in claim 7, further comprising the steps of erecting a pair of support poles in an area of ground and affixing ends of the support cable to the support poles in spaced relation from the ground.

10. The method recited in claim 7, wherein the first and the second deformable cylinders comprise a polyvinylchloride material.

11. The method recited in claim 7, wherein the support cable comprises a seven-stranded cable.

12. The method recited in claim 11, wherein the cable length is coated with an anti-slippage material.

13. The method recited in claim 7, wherein the cable length comprises one of a single-stranded and a two-stranded cable.

14. The method recited in claim 7, wherein the support cable comprises a galvanized top layer.

15. A system for securing a tree in an upward orientation comprising:
   a helically wound support cable extending substantially horizontally;
   a first deformable cylinder having a longitudinal slit extending from a first end to a second end and into a lumen thereof, the lumen dimensioned for being positioned over the support cable;
   a length of helically wound cable formed into a "V" shape;
   a second deformable cylinder threaded over the length of cable to a position covering a notch of the "V" shape;
   wherein in use the first deformable cylinder is positioned over the support cable, a first side of a tree trunk is positioned adjacent the first deformable cylinder, the second deformable cylinder is placed on a second side of the tree trunk opposed to the first side, and each end of the cable length is wound around the support cable on opposite sides of the tree.

16. The system recited in claim 15, wherein the first and the second deformable cylinders comprise a polyvinylchloride material.

17. The system recited in claim 15, wherein the support cable comprises a seven-stranded cable.

18. The system recited in claim 15, wherein the cable length comprises one of a single-stranded and a two-stranded cable.

19. The system recited in claim 18, wherein the cable length is coated with an anti-slippage material.

20. The system recited in claim 15, further comprising a pair of spaced-apart, substantially vertical support poles, wherein each end of the support cable is affixed to a respective support pole in spaced relation from ground.

* * * * *